United States Patent [19]

Norman, Jr. et al.

[11] Patent Number: 5,213,367
[45] Date of Patent: May 25, 1993

[54] BI-LEVEL PORTABLE STORAGE TANK

[75] Inventors: Eddy Norman, Jr., Springer; Billy S. Brown, Sulphur, both of Okla.

[73] Assignee: Spade Leasing, Inc., Springer, Okla.

[21] Appl. No.: 851,802

[22] Filed: Mar. 16, 1992

[51] Int. Cl.⁵ .................................................. B60P 3/22
[52] U.S. Cl. ................................. 280/837; 182/127; 182/113; 220/1.5; 280/163; D12/95
[58] Field of Search ............... 280/837, 423.1, 789, 280/839, 838, 836, 163, 831, 832; 296/181; 182/127, 113, 83, 129; 220/1.5; 105/358; D12/89, 95, 97

[56] References Cited

U.S. PATENT DOCUMENTS

| | | | |
|---|---|---|---|
| D. 136,705 | 11/1943 | Meyer | 280/837 X |
| D. 173,304 | 10/1954 | Dalglish | 280/837 X |
| D. 193,294 | 7/1962 | Mendez | D12/95 |
| D. 213,951 | 4/1969 | Wills | D14/3 |
| D. 220,174 | 3/1971 | Holland | D14/3 |
| D. 253,051 | 10/1979 | Pletcher | D12/95 |
| D. 256,348 | 8/1980 | Galloway | D12/96 |
| D. 301,326 | 5/1989 | Adams | D12/95 |
| D. 318,033 | 7/1991 | Pelt | D12/95 |
| 4,589,565 | 5/1986 | Spivey | 220/71 |
| 4,613,053 | 9/1986 | Kimura et al. | 220/22 |
| 4,874,184 | 10/1989 | Boyer | 280/423.1 |
| 5,004,269 | 4/1991 | Pelt | 280/837 |
| 5,058,924 | 10/1991 | Whatley, Jr. | 280/837 |

FOREIGN PATENT DOCUMENTS

2623353 12/1977 Fed. Rep. of Germany ...... 280/163
0831945 5/1981 U.S.S.R. ............................. 182/127

Primary Examiner—David M. Mitchell
Assistant Examiner—Florian Zeender
Attorney, Agent, or Firm—Dougherty, Hessin, Beavers & Gilbert

[57] ABSTRACT

A single step, bi-level portable storage tank which includes contiguous forward and rear generally rectangular liquid storage sections each having side walls and having a common bottom wall, the forward storage section having a lower roof than the roof of the rear storage section. A forwardly facing break wall joins the forward end of the roof of the rear storage section to the rear of the roof of the forward storage section at a location which is about one-third of the distance from the forward end of the tank to the rear end thereof. A ladder and stairway at the forward end of the storage tank accesses a rearwardly extending walkway which crosses the roof of the forward storage section to the break wall.

30 Claims, 2 Drawing Sheets

BI-LEVEL PORTABLE STORAGE TANK

FIELD OF THE INVENTION

The present invention relates to a tank for storing large volumes of liquid, and which can be transported over-the-road by a towing vehicle without exceeding dimensional limits, especially height, established by law, and which, by its construction, facilitates greater safety in filling, emptying, cleaning and maintaining the tank.

BACKGROUND OF THE INVENTION

Brief Description Of The Prior Art

Large tanks are currently provided for storing and dispensing liquids, such as fracturing fluids, drilling muds, crude oil and various other liquids or slurries at a time when the tank is stationary, but which, when the tank has been emptied, are susceptible to over-the-road towing. These tanks are generally of relatively large capacity, holding thousands of gallons of liquid. They typically have lengths of 30–40 feet and a height of from about 9 feet to 12 feet.

In general, tanks constructed for the described purpose have ground-engaging skids which permit them to be towed short distances to a situs of use, or moved, even when full, from one location to the other by sliding on the skids. For over-the-road transport, however, such tanks generally have a king pin at the forward end thereof, and are moved by engaging the king pin with the fifth wheel of a tractor vehicle. The tractor vehicle then provides the motive power for moving the empty tank a substantial distance in over-the-road transport. The fifth wheel of the tractor vehicle is frequently located at a vertical level which is from about 3 to 5 feet above the surface of the roadway. The front end of the storage tank is therefore elevated by that amount when the king pin is engaged with the fifth wheel for towing, because the fifth wheel is located beneath the front end of the tank when the tank is in the towing status. This elevation creates a concern for maintaining the maximum height of the tank at a level which is below the clearance afforded beneath underpasses, and, in most instances, in order also to comply with legally established maximum height dimensions. Because of this consideration, the geometry of the tank becomes of concern when attempting to stay within the described maximum height constraints, and yet provide a sufficiently large volume in the tank to accommodate the liquid loading which is desirable. In order to accomplish this, tanks have been made in various configurations, such as trapezoidal or with a stepped top or roof of incrementally decreasing height, so as to afford more internal volume in the same length and width of tank, and yet avoid the forward end of the tank extending to a height such that the tank exceeds the maximum legal height when transported, or a risk of collision with underpasses or the like is possible.

Another consideration which has entered prominently into the design of large liquid storage tanks of the type described is the need to have ready and unobstructed access to the interior of the tank from the upper side thereof. From a work station at this location, the maximum level of liquid in the tank can be determined and controlled, the liquid contents can be gauged with simple instruments, the tank can be cleaned and other necessary operations can be performed with maximum facility and ease.

In some types of tanks of this sort, in order to provide the access and work area which has been described, a flat surface has been provided on the tank roof near the rear of the tank. From this location, access is had to the interior of the tank for performing various operations at the time when the tank is in use for the storage of liquid, or is being placed in use or is being decommissioned. In such instances, particularly with the trapezoidal tanks which have been described, the relatively smaller forward end of the tank extends to a substantially lower height at a time when the bottom of the tank rest flatly on the ground (as contrasted with being hoisted up for king pin/fifth wheel engagement for over-the-road transport). This necessitates movement by personnel from the forward end to the rear end of the tank by walking up the inclined roof surface from the forward end of the tank toward the flat work area at the rear of the tank roof. Such access entails danger to working personnel when the tank is wet or slippery due to rain or ice or snow accumulation on the tank roof.

BRIEF DESCRIPTION OF THE PRESENT INVENTION

The present invention provides a new and advantageous construction in portable liquid storage tanks of the type described. The invention provides a tank which complies with all over-the-road transport maximum height limitations imposed by law, will pass safely under all overhead obstructions such as overpasses and tunnel roofs, yet which provides for a forward roof top work area which can be safely used, and is readily accessible so as to save substantial time in carrying out the various functions and work operations entailed in filling, gauging, cleaning and emptying the tank when it is in use. While providing the safe work area at the described accessible location, and limiting the maximum tank height to within the imposed legal and practical constraints, the tank retains a large capacity and yet is sufficiently limited in width and length to be maneuverable and to meet various legal limits imposed on these dimensions of the tank when it is in over-the-road transport.

Broadly described, the liquid storage tank of the present invention is a single step, bi-level portable liquid storage tank which has a single step formed in the roof of the tank between the front end and the rear end of the tank, with the break between roof levels occurring approximately one-third of the overall length of the tank from the front toward the rear. This break enables a flat work surface to be provided at the forward end of the tank, and it achieves the function of reducing the vertical dimension of the forward wall of the tank, so that when the tank is towed behind a tractor, with the front end elevated by reason of the king pin/fifth wheel connection, the tank is sufficiently limited in height at the forward end to easily pass beneath underpasses and facilitate operation of the tractor/tank tow within the dimensional constraints imposed by law. A serially interconnected ladder, stairway and walkway are provided to assure safe access to the work area located on the flat roof at the forward end of the storage tank.

An important object of the invention is to provide a liquid storage tank which can be safely used due to the location on the forward roof thereof of an adequately sized, safe working area which is accessed by a ladder, inclined stairway and walkway which can be safely used, even in wet or icy weather, but which do not provide an impediment to over-the-road transport of the tank as a result of any increase in effective structural height caused by any of the described stairways or walkways.

A further object of the invention is to provide a single step, bi-level liquid storage tank which has two roof levels at the upper side thereof, thereby facilitating lifting the forward end of the tank up for towing, yet still retaining a sufficiently short dimension at the front end of the tank to permit the tank to pass beneath underpasses and through tunnels and the like without physical damage to the tank o injury to personnel.

Another object of the invention is to provide a single step, bi-level tank which has its roof stepped at a location which permits safe and legal transport of the tank, yet enables a significant and acceptable volumetric capacity to be realized in the case of liquid storage in the tank when it is stationary.

Another object of the invention is to provide a liquid storage tank which is susceptible to being transported over-the-road, but which may also be moved short distances on a skid system provided beneath the tank, and supporting the tank on the ground.

A further object of the invention is to provide a portable liquid storage tank which can contain and dispense various liquids when it is stationary and rests upon skids on the ground, and which permits workmen to have access to the surface of the liquid which is stored in the tank, and to gauge the liquid volume in the tank, all from a work station which is easily accessed without risk to personnel in ascending to the top of the tank for this purpose.

Additional objects and advantages of the invention will become apparent as the following detailed description of the invention is read in conjunction with the accompanying drawings which illustrate a preferred embodiment of the invention.

DETAILED DESCRIPTION OF A PREFERRED EMBODIMENT OF THE INVENTION

Figure 1:
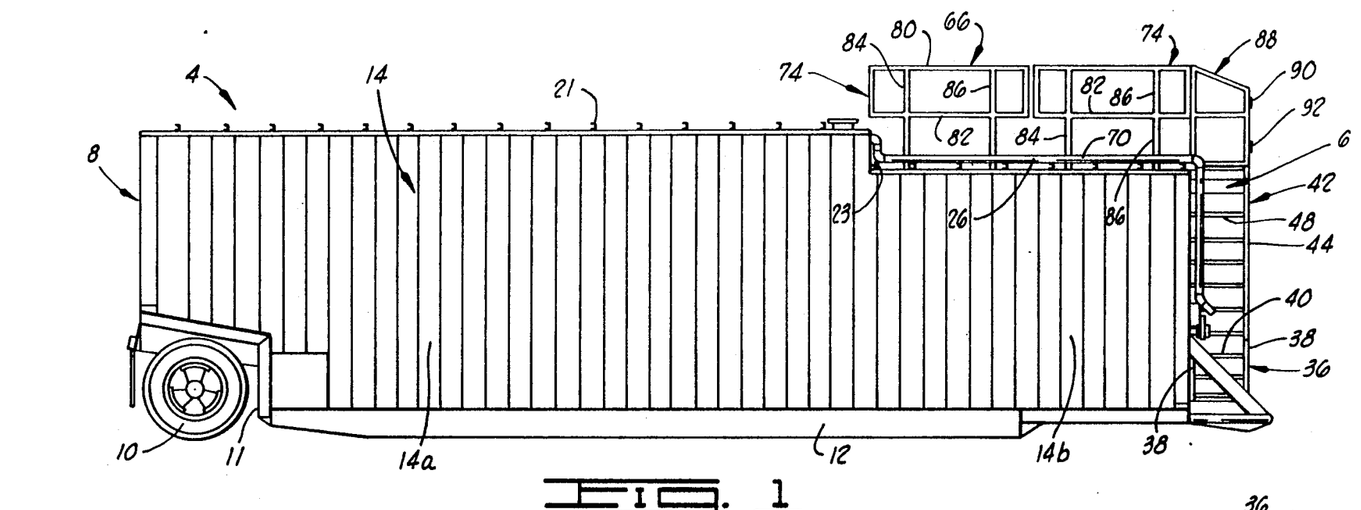
FIG. 1 is a side elevation view of the bi-level storage tank of the invention.

Referring initially to FIG. 1 of the drawings, the single step, bi-level portable storage tank 4 of the invention is shown therein in side elevation. The storage tank 4 includes a forward end 6 depicted at the right of FIG. 1, and also shown in FIG. 3, a rear end 8 depicted at the left of FIG. 1, a top and a bottom. The tank 4 is supported upon two pairs of ground-engaging transport wheels 10. The wheels 10 are mounted on an axle and positioned in a wheel well 11 located at the lower rear side of the tank 4 in a construction which is well understood in the art, and relatively conventional.

The single step, bi-level portable storage tank 4 broadly includes two parts which constitute a contiguous forward liquid storage section, and a rear liquid storage section which are each of substantially right parallelepiped configuration. The forward storage section and rear storage section of the tank 4 join each other and include a common bottom wall (not shown) which extends from side-to-side and front-to-rear of the tank, and which carries at its lower side, a plurality of parallel, longitudinal skids or runners 12. The tank 4 has a pair of opposed, substantially parallel side walls 14 which extend from the rear of the tank to the forward end portion of the tank. Each of the side walls 14 includes a rear side wall part 14a and a forward side wall part 14b.

Figure 2:
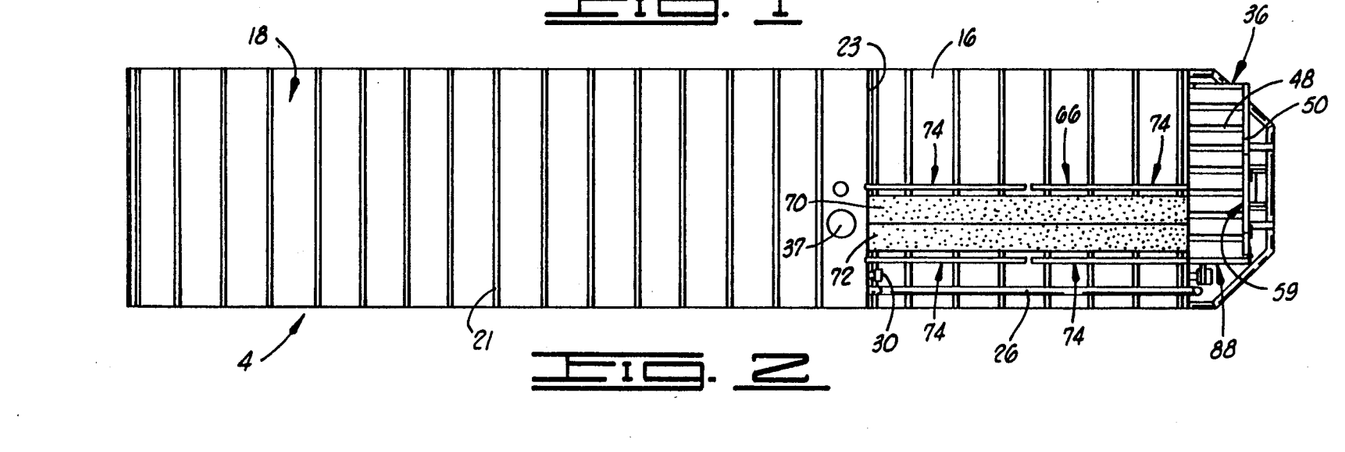
FIG. 2 is a top plan view of the bi-level storage tank of the invention.

The forward generally rectangular liquid storage section includes a top wall or roof 16 which projects from the forward end of the storage tank rearwardly for about one-third of the length of the storage tank, and which extends from side-to-side of the storage tank (as shown in FIGS. 1 and 2). The rear liquid storage section defined between the side walls 14a and above the common bottom wall or floor has a rear top wall or roof 18 which extends substantially horizontally at a time when the tank is stationary and resting upon the ground. It is at that time that the tank is normally used for containing various types of liquid, such as oil well fracturing fluid or the like.

The horizontally extending rear roof or top wall 18 of the rear storage section and the horizontally extending top wall or roof 16 of the forward liquid storage section extend between the side walls 14 of the storage tank, and are reenforced by transversely extending channel elements or ribs 21. The disposition of the channel members 21 outside of the tank 4, and functioning at this location to reenforce the top wall or roof of the rear liquid storage section and the roof of the forward section, is an advantage over the location of structural reenforcing elements on the inside of the tank as used in some types of prior tank constructions. This is partly because of the improvement in the ease with which the liquid contents of the tank can be removed, and the tank thereafter cleaned without obstruction from internal struts, ribs, braces or other structural members.

An important aspect of the present invention is the geometry of the tank 4 which permits it to hold a very large volume of liquid when it is functioning as a storage tank, and to do so without the necessity for the tank having an exceptional length, or having a height such that it cannot always safely clear overpasses or other structures which require the tank height to be within certain maximum vertical dimensions.

Figure 7:
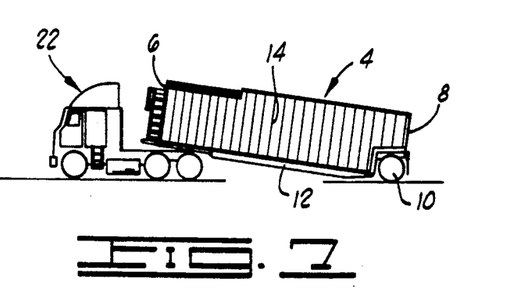
FIG. 7 is a schematic illustration of the bi-level storage tank connected to a tractor vehicle for purposes of over-the-road transport.

To better understand the merit of the present invention and its advantages over prior art tank structures, reference can be made to FIG. 7 of the drawings where the appearance of the tank 4 at a time when it is connected for towing to the fifth wheel of a tractor rig 22 has been schematically illustrated. It will be noted that the tank, when towed, is inclined downwardly and rearwardly from the point of connection to the fifth wheel of the tractor. Because of this, the highest point on the tank, were the tank rectangular and of uniform height over its entire length, would be toward the forward end of the tank. The rear upper side of the tank would be substantially lower. The result of these constraints, when the tank is rectangular in configuration, and assuming the same overall length of the tank is retained for all types, as well as the same width, is to restrict the volumetric capacity of the tank. Thus, if the tank is rectangular, the height of the tank is limited at both ends of the tank by the extent to which the elevated forward wall extends vertically in the air, and the over-the-road height restrictions which are legally imposed in order to permit the tank to pass safely beneath overpasses.

One effort to overcome the described difficulty resulting in either reduced volumetric capacity, or alternatively requiring the overall length of the tank to be increased, has been to construct the tank to be trapezoidal in configuration so that the rear wall of the tank extends somewhat higher than the forward wall. This means that the roof of the tank, which extends in substantially the same plane from the rear to the front of the tank, is substantially horizontal when the tank is connected to the fifth wheel of the tractor vehicle. Thus, no part of the roof protrudes any higher than any other part, and therefore volumetric desiderata can be me&: more easily without violating some of the rules and laws that may relate to the dimensional characteristics of vehicles which can move on certain highways.

In these types of large tanks, the customary mode of usage calls for the tank to be towed, usually empty, from one location to another where the use in storing liquid is to be carried out. At the destination, the tank is disconnected from the tractor vehicle and is there rested upon the ground, using the skids alone, or using the skids and the ground-engaging wheels for ground engagement. In such event, where the tank is of the described trapezoidal configuration, a slope comes to characterize the attitude of the roof or top wall of the tank, with the slope extending downwardly all the way from the rear of the tank to the front end thereof.

In such trapezoidally-shaped tanks, a relatively flat (horizontal) work area is often provided at the rear upper side of the tank. This enables such operations as the filling of the tank, sounding of the tank to develop an ullage reading, interior cleaning through manways, and the like, to be carried out from the upper side of the tank. With the storage tank rested upon the ground, the remainder of the top wall or roof forward of the flat, horizontally extending work area slopes downwardly to the relatively short forward wall. This, of course, locates the flat work area at the highest part of the tank (near the rear thereof), and access to this work area is limited because of certain structural interferences preventing the location of ladders at the rear side of the tank. Consequently, access is by means of a ladder located at the forward end of the tank, and then by walking up the sloping roof to the work area at the rear of the tank. This presents a safety hazard at times when inclement weather causes the roof to be slick with rain or ice. In the latter event, it is sometimes almost impossible to reach the work area from the forward side of the tank where the ladder is located, and accidents sometimes happen. Moreover, the time required to carry out a filling or cleaning operation from the work area at the rear of the tank is extended by reason of the necessity to move back and forth across the roof of the tank from the forward end to the work area located above the rear end portion of the tank.

One compromise prior art construction which undertakes to make it less dangerous to traverse the sloping roof is a stepped top tank of the construction disclosed in U.S. patent application 07/783,578, assigned to the assignee of the present invention. Where a stepped top tank of the type there described is placed in use for the containment of a large volume of stored liquid, the steps formed in the roof in the manner there described aid greatly in preventing the occurrence of accidents, but also substantially increase the expense of construction of the tank. Moreover, the volumetric capacity is thereby slightly reduced relative to a trapezoidally-shaped tank of the same length and width.

From the foregoing discussion, it will be seen that several desiderata enter into the design and construction of large liquid storage tanks of the type here under discussion. First, from the economic standpoint, it is desirable that the tank be able to store as much liquid as possible—at least that it store a volumetric amount which is competitive with the volumetric amounts stored in other types of liquid storage tanks now marketed for this purpose. Typically, these tanks contain about 21,000 gallons of liquid. A second constraint which dictates the geometry of the tank is the highway legal (and practical) dimensional limits which must be met by the tank. Thus, a tank width which does not exceed about 8½ feet is now legally mandated. The overall length of the tank, from the standpoint of legal regulation, cannot exceed 45 feet, although as a practical matter, in terms of ease of handling (towing, turning and maneuverability), a length of about 37 feet is widely used and is generally satisfactory.

A critical dimension which certainly must be observed in structures of this type is the overall or effective height of the tank during over-the-road transport. The tank will, in almost every instance, have a greater total height at its highest point than does the tractor by which the tank is towed. The roof of the tank at its highest point must therefore be less than the maximum vertical dimension specified for over-the-road vehicular travel by governmental regulation. This varies slightly from state-to-state, but in general, is set at about 12 feet.

Another desiderata related to the last, and which is to some extent fixed and inflexible, is the manner in which such tanks are towed from one place to another. Basically, the large liquid storage tanks of this kind carry a king pin which projects down from the forward center of the bottom of the tank. This king pin is connected to a fifth wheel carried on a towing tractor, and the fifth wheel is generally located at least three feet, and not more than five feet, above the surface of the roadway to be traversed by the tractor and the liquid storage tank towed thereby.

Accepting for purposes of this discussion, a practical upper limit of five feet for the height above the ground of the fifth wheel and king pin connection, this means that slightly more than five feet must be added to the vertical dimension of the front wall of the tank in order to establish the vertical distance to which the tank will extend at its forward end when it is being towed over the road. If the tank is rectangular in configuration, this, of course, establishes the "at rest" height of the tank from one end thereof to the other. On the other hand, if the tank is trapezoidal in configuration in the manner hereinbefore described, with the smaller end of the elongated trapezoid being the forward end thereof where the king pin/fifth wheel connection is made, the roof or upper wall of the tank will become substantially horizontal as the forward end of the trapezoidally-shaped tank is hoisted up for connection of the king pin to the fifth wheel for over-the-road travel. In such case, one dimension which establishes the limit of height of the tank is the vertical height of the tank as measured from the point where the ground wheels engage the roadway to the top of the tank at the rear end thereof, i.e., the largest end portion of the trapezoid.

It will be perceived that various breaks in the top wall or roof of the tank between the vertically extending rear wall and the vertically extending forward wall can affect the overall height of the tank, and the overhead clearance which can be expected to characterize the tank as it moves beneath various overpasses which must be traversed during over-the-road travel.

The last consideration is, as has been mentioned above, the desirable provision of a flat work area or work space on the roof of the tank where filling, removal of overflow and some other functions which require access to the interior of the tank from the upper side thereof can be optimally carried out. Such work area or surface must afford ready access to the interior of the tank, and must be usable with ease and without endangering the safety of operating personnel. In being flat, it enhances personnel safety, as well as allowing fittings, parts and tools to be laid down and retained within easy :.each of the workmen.

In accordance with the present invention, the roof or top wall which closes the forward liquid storage section of the tank 4 is located at a lower level than the roof or upper wall which closes the top of the rear liquid storage section. The rear liquid storage section is approximately twice the length of the forward liquid storage section, or, stated differently, the roof 16 at the upper side of the forward liquid storage section extends about one-third of the way from the front of the tank to the rear thereof. Both the forward roof 16 and the rear roof 18 extend substantially parallel to the common floor or bottom of the tank 4. Both roofs and the floor are substantially horizontal at a time when the storage tank 4 has been disconnected from the tractor and is resting upon the skids 12 and is in use for liquid storage.

In a preferred embodiment of the invention, the overall length of the storage tank is about 37 feet. Its width is about 8 feet, and the length of the forward roof 16 can be from about 10 feet to about 20 feet. Shortening or lengthening of the forward roof 16 at the forward end of the tank will generally require some slight shortening or lengthening of the overall length of the tank, if the same gallonage or volumetric capacity is to be retained.

As has been previously pointed out, the flat forward roof or upper wall 16 presents a work area or space at the forward end of the tank 4 in a readily accessible location. The forward roof 16 constituting such work area terminates at the bottom of a break wall 23 which extends substantially vertically from the roof 16 up to the rear roof 18. The break wall 23 provides a convenient location to which a fill line 26 may be attached via a suitable fitting in the break wall. The fill line 26 is used for filling the tank 4. The break wall 23 also carries a vent or overflow nipple 30 which can be used to relieve excessive liquid or pressure build up from a location near the highest point in the tank 4. The work area constituted by the forward roof 16 also enables access to be had to a hatch or manway 37 which can be employed for gaining access to the interior of the tank for cleaning purposes, or even to allow a person to enter the tank 4 at this location. Other fittings may be provided on the break wall 23 or on the forward end of the rear roof 18 for accessing the contents of the tank, or adding a liquid additive to the contents of the tank and for other operations to be carried out from time-to-time during or after storage of a liquid in the tank.

In order to provide access to the work area from a location on the ground, a ladder section, stairway subassembly and walkway subassembly are provided and cooperate to facilitate such access. At the forward end of the tank, a stationary, vertically extending ladder section 36 is provided at on Ⓡside of the tank. The ladder section 36 includes a pair of vertical side posts 38 which also function as hand rails, and which are connected by a plurality of spaced, horizontally extending rungs 40.

A stairway subassembly, denominated generally by reference numeral 42, extends upwardly and laterally from the forward side of the tank where the ladder is located to a location relatively near to the top of the tank adjacent its opposite side. In general, the stairway subassembly 42 includes a pair of upwardly inclined, horizontally spaced, parallel risers 44 having a plurality of vertically spaced, horizontally offset or staggered steps 48 extending between the risers as in conventional stairway construction. Hand rail 50 is located above the forward one of the parallel risers 44.

The lower end of the hand rail 50 is secured to the upper end of one of the ladder posts 38. The hand rail 50 is made in two parts, and the upper end portion of the hand rail has its upper end connected to one end of a short section of rectangularly cross-sectioned tubing 54 which is joined at its other end to a vertically extending post or tubing section 56. A horizontally extending tubing section 58 having one end connected to the tubing section 56 and the other to the upper portion of hand rail 50 completes a trapezoidally configured foldable upper portion 59 of the forward side of the stairway subassembly.

Figure 3:
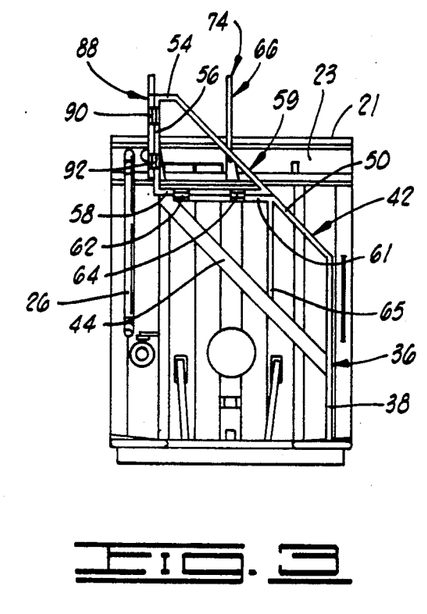
FIG. 3 is a front elevation view of the bi-level storage tank showing the ladder and walkway in their erected operative positions.
Figure 4:
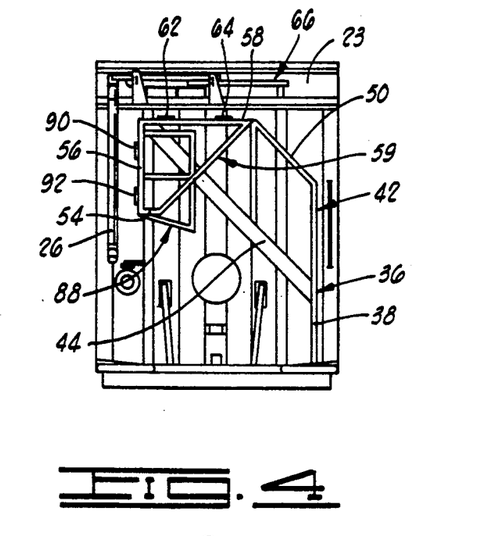
FIG. 4 is a front elevation view of the bi-level storage tank showing the stairway and walkway in their downfolded positions.

The trapezoidally-shaped upper portion 59 of the stairway subassembly is hingedly connected to a horizontally extending diagonal brace member 61 by hinges 62 and 64. It will be noted in referring to FIG. 3 that the upper inner end of the lower portion or section of the hand rail 50 is secured to, and supported by, a vertically extending stairway post 65. During over-the-road transport of the tank, the trapezoidal upper portion 59 of the stairway subassembly 42 can be folded downwardly about the hinges 62 and 64, so that this trapezoidal section occupies a vertically extending plane just ahead of the riser 44. This status is shown in FIG. 4.

On the upper side of the tank 4, and extending along the right or starboard side of the forward end of the tank, is a walkway subassembly 66. The walkway subassembly 66 is foldably supported on the forward roof 16 and is best illustrated in FIGS. 1, 2 and 3. The walkway subassembly 66 includes a pair of horizontally extending side-by-side footwalks which, in the illustrated embodiment, are expanded metal tread plates 70 and 72. The tread plates 70 and 72 are secured to the horizontally extending channel rafters 21 which extend transversely across the working surface constituted, in part, by the forward roof 16.

At opposite longitudinally extending side edges of the two tread plates 70 and 72, two longitudinally aligned, vertically extending foldable hand rail sections 74 are provided. The hand rail sections 74 are aligned parallel to the fore-and-aft axis of the tank 4, and are pivotally mounted for extension upwardly so as to be located, in their operative positions in opposed, parallel vertical planes. The hand rail sections 74 are located at opposite sides of the tread plates 70 and 72 to provide safety to workmen walking along, or working upon, the forward roof 16. As will be better understood from the following description, the hand rail sections 74, which can include horizontally and vertically extending bars interconnected in various configurations, can be made of substantially any height desired by reason of the location of the hand rail sections, and the manner in which they can be folded downwardly into a horizontally extending position atop the forward roof 16, as is, of course, necessary for over-the-road transport. Detailed construction of two typical hand rail sections 74 used in a preferred embodiment is depicted in FIG. 1. Each hand rail section 74 includes a pair of vertically spaced horizontally extending parallel rails 80 and 82 interconnected by a pair of vertical posts 84 and 86.

A safety gate, designated generally by reference numeral 88, is located forwardly of the right hand rail section 74 illustrated in FIG. 1 and shown from above in FIG. 2. The safety gate 88 is in longitudinal alignment with the hand rail section 74 and has its forward end hingedly connected by hinges 90 and 92 to the post or vertical tubing section 56 forming a part of the trapezoidally configured upper portion 59 of the stairway subassembly 42. The safety gate can be latched in the position illustrated in FIGS. 1 and 2 at a time when the tank 4 is rested upon the ground and is being used for the storage of liquids so that access needs to be had to the work area over the forward roof 16 at the top of the tank. At this time, workmen need to proceed to this area from the ground and to return periodically to the ground. The tread plates 70 and 72, as well as the walkway subassembly 66 and stairway subassembly 42 facilitate such access at this time. As an example of one type of operation or action which may be desirable at this time, gauging the contents of the tank may be necessary or desirable, and for the purpose, the cap on the vent or overflow nipple 30 may need to be removed, or it may be necessary to remove the cover on the hatch or manway 37. It is also possible by the access route described to reach, utilize and maintain the fill line 26 if such should be desirable.

At the time when the liquid storage tank 4 is to be transported over-the-road, it is intended to be in an empty status. At this time, it is necessary, in order to bring the tank dimensions within the limits imposed by law, and to facilitate transport beneath underpasses and through tunnels, to fold the walkway subassembly 66, and more specifically the hand rail sections 74, downwardly from their vertically extending positions, illustrated in FIGS. 1, 2 and 3, to the down folded position illustrated in FIG. 4. Before describing the structural characteristics which facilitate such down folding of the hand rail sections 74, and a portion of the stairway subassembly 42, it may be helpful to point out that the over-the-road transport position of the storage tank 4, when it is connected to a tractor vehicle, appears as shown in FIG. 7. There the tractor vehicle is denominated by reference numeral 22 and it is connected through its fifth wheel and the king pin of the tank to the tank 4 so as to facilitate over-the-road travel. It will be noted that at this time, the walkway subassembly 66 is in its down folded status so that the height of the tank at its forward end is not increased by the erected hand rail sections 74. The upper portion 59 of the stairway subassembly 42 and the safety gate 88 are also folded down at this time.

Figure 5:
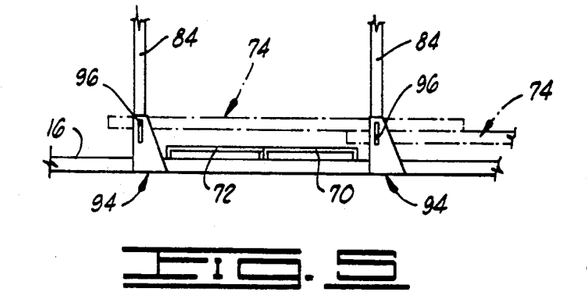
FIG. 5 is a detail view, in elevation, of a part of the structure making up the walkway subassembly used in the tank construction, and showing an alternate operative position of a part of the structure in dashed lines.
Figure 6:
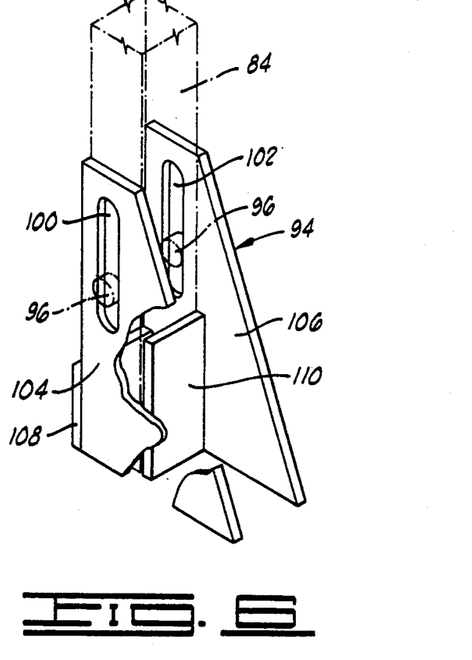
FIG. 6 is a perspective view, with parts broken away, illustrating a hinge pocket subassembly utilized as a part of the walkway structures employed in the invention.

The manner in which the safety gate 88, trapezoidally configured upper portion 59 of the stairway subassembly 42 and the hand rail sections 74 fold down for over-the-road transport is best illustrated in FIGS. 4, 5 and 6 of the drawings. Referring initially to FIG. 4, it will be noticed that the safety gate 88 has been pivoted on a vertical axis as facilitated by the hinges 90 and 92, so that it is brought flatly against the trapezoidally configured upper portion 59 of the stairway subassembly 42. The trapezoidally configured upper portion 59 of the stairway subassembly 42 is then folded downwardly about a horizontal axis as facilitated by the hinges 62 and 64. The down folded structure then has the appearance depicted in FIG. 4 where the trapezoidally configured upper portion 59 and the safety gate 88 occupy contiguous parallel vertical planes at the forward side of the tank 4.

At this time, the hand rail sections 74 may also be folded down to the position shown in dashed lines in FIG. 5. In accomplishing this change of status, the hand rail sections 74 are initially pulled upwardly by gripping the bars or hand rails 80 at the upper side of each of the hand rail sections and pulling up. This causes the vertical posts 84 and 86 of each hand rail section to slide upwardly in a pair of hinge pocket subassemblies 94 illustrated generally in FIG. 5, and in detail in FIG. 6.

Each one of the hinge pocket subassemblies 94 receives one of the vertically extending posts 84 or 86 of on of the hand rail sections 74. Each of these posts 84 and 86 extending into one of the hinge pocket subassemblies 94 carries a pair of oppositely protruding pins 96 which extend outwardly from opposite sides of the lower portion of the respective vertically extending post. The pins 96 slidingly enter slots 100 and 102 formed in a pair of trapezoidal side plates 104 and 106 constituting the opposite sides of each of the hinge pocket subassemblies 94. Each hinge pocket subassembly 94 further includes a relatively short blocking plate 108 at one side thereof and interconnecting the side plates 104 and 106, and a substantially longer support plate 110 extending parallel to the short blocking plate 108 and projecting between the trapezoidal side plates 104 and 106 at a location spaced from the blocking plate. In this structural arrangement, pulling the hand rail sections 74 upwardly causes the posts 84 and 86 and the pins 96 carried thereby to move upwardly in the slots 100 and 102 in the respective trapezoidal plates 104 and 106.

After the lower ends of the respective posts 84 and 86 are lifted up sufficiently high, the short blocking plate then allows each hand rail section 74 to be pivoted in a transverse direction so that it lays down into the folded, horizontally extending position depicted in dashed lines in FIG. 5. When in this position, the hand rail sections extend parallel to the flat roof 16 at the forward end of the tank 4, and are in a lowered position where they do not interfere with over-the-road transport. The hand rail sections 74 are erected by reversing the steps used to retract and fold them downwardly. They are held in the erected position by the confinement of each of the lowered posts 84 and 86 between the blocking plate 108 and the support plate 110 of each hinge pocket subassembly 94.

From the foregoing description of the invention, it will be perceived that the present invention provides a liquid storage tank which meets the legal requirements as to dimensions of tanks towed over-the-road, while providing a generous volumetric capacity and which provides a work area which is accessible via a route having safety structures used by workmen accessing the work area located on the forward roof of the tank.

From the description of the invention, it will be perceived that some structural changes can be made in the described embodiment without departure from the basic inventive principles which are entailed in the general construction. Changes and innovations of this type are therefore deemed to be circumscribed by the spirit and scope of the invention, except as the same may be necessarily limited by the appended claims when they are expanded by interpretation to their full limits as allowed by the doctrine of equivalents.

What is claimed is:

1. A single step, bi-level portable liquid storage tank comprising:
   a tank having a generally rectangular parallelepiped forward liquid storage section and having a generally rectangular parallelepiped rearward liquid storage section contiguous and joined to said forward liquid storage section and having an interior communicating with the interior of said forward liquid storage section, said forward liquid storage section and rearward liquid storage section having a common bottom wall and a pair of opposed, parallel, common side walls, said forward liquid storage section having:
   a vertically extending forward wall; and
   a forward roof extending transversely between, and joining, said side walls at the forward portion of the tank, said forward roof extending rearwardly from said forward wall over a distance equivalent to from about one-third to about three-eighths of the total length of the tank and defining an upwardly facing work area;
   said rearward liquid storage section having:
   a vertically extending rear wall at the rear of said tank; and
   a rear roof extending across the upper rear portion of said tank over said rearward liquid storage section, and connected to said side walls at the rear portion of said tank, said rear roof extending in a plane spaced vertically upwardly from said forward roof and extending substantially parallel to said forward roof; and
   a break wall interconnecting the forward end of said rear roof and the rearward end of said forward roof;
   a vertically extending ladder section secured to said forward wall on the outer side of said tank and having an upper end spaced downwardly from said forward roof;
   an inclined stairway subassembly having a lower end located adjacent the upper end of said ladder section, and having an upper end adjacent the level of said forward roof; and
   a walkway subassembly extending rearwardly from said upper end of said stairway subassembly along said forward roof to a location near said break wall.

2. A single step, bi-level portable liquid storage tank as defined in claim 1 wherein the overall length of said tank as measured between said vertically extending forward wall and vertically extending rear wall is from about 35 feet to about 45 feet, and wherein the length of said forward roof as measured from said forward wall to said break wall is from about 10 feet to about 20 feet, and is between about one-third and three-eighths the overall length of the tank.

3. A single step, bi-level portable liquid storage tank as defined in claim 1 wherein said stairway subassembly comprises:
   a pair of parallel, upwardly and laterally extending risers along said forward wall;
   a plurality of steps extending between said risers;
   a hand rail disposed above and extending parallel to said risers, said hand rail having an upper part, and having a lower part separated from said upper part;
   a trapazoidally configured upper part pivotally connected to the lower part of said hand rail for pivotation from an upwardly extending position to a folded down position.

4. A single step, bi-level portable liquid storage tank as defined in claim 1 and further characterized as including an elongated, flexible fill line having one end connected to said break wall and communicating with the interior of the tank, lying alongside said walkway and extending down the outside of the forward wall of said tank.

5. A single step, bi-level portable liquid storage tank as defined in claim 1 and further characterized as including:
   a wheel well at the rear lower side of said tank; and
   ground-engaging wheels in said wheel well.

6. A single step, bi-level portable liquid storage tank as defined in claim 1 wherein said walkway subassembly comprises a pair of spaced parallel hand rail sections foldably attached to the upper side of the tank at the location of the forward roof, and each foldable from an upwardly extending position to a folded-down, horizontally extending position.

7. A single step, bi-level portable liquid storage tank as defined in claim 6 wherein said walkway subassembly further includes a safety gate aligned with one of said hand rail sections of said walkway subassembly, and foldably connected to said stairway subassembly for folding from an upstanding position to a retracted, down folded position.

8. A single step, bi-level portable liquid storage tank as defined in claim 6 wherein each of said hand rail sections comprises:
   a horizontally extending top rail; and
   a plurality of downwardly extending posts each having an upper end connected to said top rail and each having a lower end; and
   a plurality of spaced hinge pocket subassemblies connected to said forward roof, each of said hinge pocket subassemblies pivotally receiving the lower end of one of the downwardly extending posts of one of said hand rail sections so that each of said hand rail sections can be erected vertically, or alternatively, folded down flatly on top of said forward roof.

9. A single step, bi-level portable liquid storage tank as defined in claim 8 wherein the overall length of said tank as measured between said vertically extending forward wall and vertically extending rear wall is from about 35 feet to about 45 feet, and wherein the length of said forward roof as measured from said forward wall to said break wall is from about 10 feet to about 20 feet, and is between about one-third and three-eighths the overall length of the tank.

10. A single step, bi-level portable liquid storage tank as defined in claim 9 and further characterized as including at least two parallel skids secured to the underside of said common bottom wall.

11. A single step, bi-level portable liquid storage tank as defined in claim 8 wherein said walkway sub-assembly is further characterized in including tread plate means supported by said forward roof and extending between said hand rail sections.

12. A single step, bi-level portable liquid storage tank as defined in claim 11 wherein said stairway sub-assembly comprises:
   a pair of parallel, upwardly and laterally extending risers along said forward wall;
   a plurality of steps extending between said risers;
   a hand rail disposed above and extending parallel to said risers, said hand rail having an upper part and a lower part separated from said upper part;
   a trapezoidally configured upper part pivotally connected to the lower part of said hand rail for pivotation from an upwardly extending position to a folded down position.

13. A single step, bi-level portable liquid storage tank as defined in claim 8 wherein said walkway sub-assembly further includes a safety gate aligned with one of said hand rail sections of said walkway subassembly, and foldably connected to said stairway subassembly for folding from an upstanding position to a retracted down folded position.

14. A single step, bi-level portable liquid storage tank comprising:
   an elongated tank having a front wall, a rear wall, and having side walls and including two roof sections located at different vertical levels in two vertically spaced parallel planes, said two roof sections including a forward roof section, and a rear roof section of substantially greater length than said forward roof section;
   ground-engaging wheels secured beneath said tank adjacent the rear end thereof;
   a vertically extending ladder secured to one side of said front wall;
   a stairway subassembly mounted on said front wall and extending upwardly from the ladder; and
   a walkway subassembly supported on said forward roof section and extending rearwardly therealong from said forward wall, and being located along one side of said tank, said walkway subassembly including a pair of spaced parallel elongated hand rail sections foldably connected to said forward roof section, and foldable from an upright position to a folded down position in juxtaposition to said forward roof section.

15. A single step, bi-level portable liquid storage tank as defined in claim 14 and further characterized as including a vertical break wall extending between said forward roof section and said rear roof section;
   a fill tube connected to said break wall and communicating with the interior of the tank at a location adjacent said walkway assembly; and
   a manway in said rear roof section at a location adjacent said break wall.

16. A single step, bi-level portable liquid storage tank comprising:
   a tank having a generally rectangular parallelepiped forward liquid storage section and having a contiguous generally rectangular parallelepiped rearward liquid storage section joined to said forward liquid storage section and having an interior communicating with the interior of said forward liquid storage section, said forward liquid storage section and rearward liquid storage section having a common bottom wall and a pair of opposed, substantially parallel, common side walls, said forward liquid storage section having:
      a vertically extending forward wall; and
      a forward roof extending transversely between, and joining, the forward portions of said side walls at the forward portion of the tank, said forward roof extending rearwardly from said forward wall over a distance equivalent to from about one-third to about three-eighths of the total length of the tank and defining an upwardly facing work area;
   said rearward liquid storage section having;
      a vertically extending rear wall at the rear of said tank; and
      a rear roof extending across the upper rear portion of said tank over said rearward liquid storage section, and connected to said side walls at the rear portion of said tank, said rear roof extending in a plane spaced vertically upwardly form said forward roof; and
   a break wall interconnecting the forward end of said rear roof and the rearward end of said forward roof;
   ground-engaging wheels positioned under said rearward liquid storage section adjacent the rear end of said tank for ground transport of said liquid storage tank; and
   a vertically extending ladder and stairway assembly secured to the forward wall of said forward liquid storage section on the outer side of said tank for gaining access to the forward roof.

17. A single step, bi-level portable liquid storage tank as defined in claim 16 wherein the overall length of said tank as measured between said vertically extending forward wall and said vertically extending rear wall is from about 35 feet to about 45 feet, and wherein the length of said forward roof as measured from said forward wall to said break wall is from about 10 feet to about 20 feet, and is between about one-third and about three-eighths the overall length of the tank.

18. A single step, bi-level portable liquid storage tank as defined in claim 16 and further characterized as including a walkway subassembly extending rearwardly from said upper end of said stairway subassembly along said forward roof to a location near said break wall.

19. A single step, bi-level portable liquid storage tank comprising:
   a tank having a generally rectangular parallelepiped forward liquid storage section and having a contiguous generally rectangular parallelepiped rearward liquid storage section joined to said forward liquid storage section and having an interior communicating with the interior of said forward liquid storage section, said forward liquid storage section and rearward liquid storage section having a common bottom wall and a pair of opposed, substantially parallel, common side walls, said forward liquid storage section having:
      a vertically extending forward wall; and
      a forward roof extending transversely between, and joining, the forward portions of said side walls at the forward portion of the tank, said forward roof extending rearwardly from said forward wall over a distance equivalent to from about one-third to about three-eighths of the total length of the tank and defining an upwardly facing work area;

said rearward liquid storage section having:
  a vertically extending rear wall at the rear of said tank; and
  a rear roof extending across the upper rear portion of said tank over said rearward liquid storage section, and connected to said side walls at the rear portion of said tank, said rear roof extending in a plane spaced vertically upwardly from said forward roof; and
a break wall interconnecting the forward end of said rear roof and the rearward end of said forward roof;
ground-engaging wheels positioned under said rearward liquid storage section adjacent the rear end of said tank for ground transport of said liquid storage tank; and
a vertically extending ladder section secured to said forward wall of said forward liquid section on the outer side of the tank and having an upper end spaced downwardly from said forward roof; and
an inclined stairway subassembly secured to the forward wall of said forward liquid storage section on the outer side of said tank for gaining access to the forward roof and having a lower end located adjacent the upper end of said ladder section, and having an upper end adjacent the level of said forward roof.

20. A single step, bi-level portable liquid storage tank comprising:
an elongated tank having a front wall, a rear wall and a pair of opposed, substantially parallel side walls, and further including two roof sections located at different vertical levels in two vertically spaced parallel planes, said two roof sections including a relatively shorter forward roof section defining an upwardly facing work area, and a rear roof section which is of substantially greater length than said forward roof section;
an upwardly extending break wall extending between the rear end of said forward roof section and the forward end of said rear roof section;
a plurality of longitudinally spaced, transversely extending, substantially parallel channel elements secured to, and extending across, the forward roof section on the outer, upper side thereof;
ground-engaging wheels secured beneath said tank adjacent the rear end thereof, and inset into a well formed in the rear end of said tank;
generally vertically extending stairway means mounted on said front wall outside of said tank; and
a walkway subassembly supported on said forward roof section and extending rearwardly therealong from said front wall, said walkway subassembly including a pair of spaced, substantially parallel, elongated hand rail sections foldably connected to said forward roof section, and foldable from an upright position to a folded down position in juxtaposition to the forward roof section, said walkway subassembly further including at least one tread plate supported on said channel elements at a location spaced above the forward roof section so as to be above ice and snow formed on said roof section.

21. A single step, bi-level portable liquid storage tank as defined in claim 20 wherein each of said hand rail sections comprises:
a horizontally extending top rail; and
a plurality of downwardly extending posts each having an upper end connected to said top rail and each having a lower end;
an wherein said tank is further characterized as including a plurality of spaced, hinge pocket subassemblies, each of said hinge pocket subassemblies being connected to said forward roof section, and each of said hinge pocket subassemblies pivotally receiving the lower end of one of said downwardly extending posts of one of said hand rail sections so that each of said hand rail sections can be erected vertically, or alternatively, folded down flatly on top of said forward roof.

22. A single step, bi-level portable liquid storage tank comprising:
an elongated tank having a front wall, a rear wall and having opposed, spaced side walls and including two roof sections located at different vertical levels in two vertically spaced parallel planes, said two roof sections including a relatively shorter forward roof section defining an upwardly facing work area and a relatively longer rear roof section which is of substantially greater length than said forward roof section;
a break wall extending between the rear end of said forward roof section and the forward end of said rear roof section;
a plurality of longitudinally spaced, transversely extending channel elements secured to, and extending across, the forward roof section on the outer, upper side thereof;
ground-engaging wheels secured beneath said tank adjacent the rear end thereof and insert into a wall formed in the rear end of said tank;
a walkway subassembly supported on said forward roof section and extending rearwardly therealong from said front wall, said walkway subassembly including a pair of spaced, parallel, elongated hand rail sections foldably connected to said forward roof section, and foldable from an upright position to a folded down position, said walkway subassembly further including at least one tread plate supported on said channel elements and spaced above the forward roof section; and
each of said hand rail sections comprising:
  a horizontally extending top rail; and
  a plurality of downwardly extending posts each having an upper end connected to said top rail and each having a lower end;
and wherein said tank is further characterized as including a plurality of spaced, hinge pocket subassemblies, each of said hinge pocket subassemblies being connected to said forward roof section, and each of said hinge pocket subassemblies pivotally receiving the lower en of one of the downwardly extending posts of one of said hand rail sections so that each of said hand rail sections can be erected vertically, or alternatively, folded down flatly on top of said forward roof; and
stairs secured to the outer side of said tank and providing access to said walkway subassembly supported on said forward roof section.

23. A single step, bi-level portable liquid storage tank comprising:
an elongated tank having a generally rectangular parallelepiped forward liquid storage section and a generally rectangular parallelepiped rearward liquid storage section and having a front wall, a rear wall and a pair of opposed, substantially parallel side walls, and further including two roof sections located at different vertical levels in two vertically spaced parallel planes, said two roof sections including a relatively shorter forward roof section disposed over said forward liquid storage section an defining an upwardly facing work area, and a rear roof section disposed over said rearward liquid storage section and which is of substantially greater length than said forward roof section;

an upwardly extending break wall extending between the rear end of said forward roof section and the forward end of said rear roof section;

a vertically extending ladder section secured to said front wall outside of said tank and having an upper end spaced downwardly from said forward roof section;

an inclined stairway subassembly having a lower end located adjacent the upper end of said ladder section, and having an upper end adjacent the level of said forward roof section; and a walkway subassembly extending rearwardly from said upper end of said stairway subassembly along said forward roof section to a location near said break wall.

24. A single step, bi-level portable liquid storage tank comprising:

an elongated tank having a generally rectangular parallelepiped forward liquid storage section and a generally rectangular parallelepiped rearward liquid storage section and having a front wall, a rear wall and a pair of opposed, substantially parallel side walls, and further including two roof sections located at different vertical levels in two vertically spaced parallel planes, said two roof sections including a relatively shorter forward roof section disposed over said forward liquid storage section and defining an upwardly facing work area, and a rear roof section disposed over said rearward liquid storage section and which is of substantially greater length than said forward roof section;

an upwardly extending break wall extending between the rear end of said forward roof section and the forward end of said rear roof section; and ground-engaging wheels secured beneath said tank adjacent the rear end thereof, and inset into a well formed in the rear end of said tank.

25. A single step, bi-level portable liquid storage tank as defined in claim 24 further comprising access means for providing access to said forward roof section secured to said front wall of said tank on the outer side of said tank.

26. A single step bi-level portable liquid storage tank as defined in claim 25 wherein said access means comprise a plurality of steps secured to said front wall.

27. A single step, bi-level portable liquid storage tank comprising:

an elongated tank having a generally rectangular parallelepiped forward liquid storage section and a generally rectangular parallelepiped rearward liquid storage section and having a front wall, a rear wall and a pair of opposed, substantially parallel side walls, and further including two roof sections located at different vertical levels in two vertically spaced parallel planes, said two roof sections including a relatively shorter forward roof section disposed over said forward liquid storage section and defining an upwardly facing work area, and a rear roof section disposed over said rearward liquid storage section and which is of substantially greater length than said forward roof section;

an upwardly extending break wall extending between the rear end of said forward roof section and the forward end of said rear roof section;

a plurality of longitudinally spaced, transversely extending, channel elements secured to, and extending across, the forward roof section on the outer, upper side thereof; and ground-engaging wheels secured beneath said tank adjacent the rear end thereof, and inset into a well formed in the rear end of said tank.

28. A single step, bi-level portable liquid storage tank as defined in claim 27 further comprising access means for providing access to said forward roof section secured to said front wall of said tank on the outer side of said tank.

29. A single step bi-level portable liquid storage tank as defined in claim 28 wherein said access means comprise a plurality of steps secured to said front wall.

30. A single step, bi-level portable liquid storage tank comprising:

an elongated tank having a generally rectangular parallelepiped forward liquid storage section and a generally rectangular parallelepiped rearward liquid storage section and having a front wall, a rear wall and having opposed, spaced side walls and including two roof sections located at different vertical levels in two vertically spaced parallel planes, said two roof sections including a relatively shorter forward roof section disposed over said forward liquid storage section and defining an upwardly facing work area and a relatively longer rear roof section disposed over said rearward storage section and which is of substantially greater length than said forward roof section;

a break wall extending between the rear end of said forward roof section and the forward end of said rear roof section;

ground-engaging wheels secured beneath said tank adjacent the rear end thereof and inset into a well formed in the rear end of said tank;

a vertically extending ladder section secured to said front wall of said tank on the outer side of the tank and having an upper end spaced downwardly from said forward roof section; and an inclined stairway subassembly secured to said front wall on the outer side of said tank for gaining access to said forward roof section and having a lower end located adjacent the upper end of said ladder section, and having an upper end adjacent the level of said forward roof section.

* * * * *

UNITED STATES PATENT AND TRADEMARK OFFICE
CERTIFICATE OF CORRECTION

PATENT NO. : 5,213,367
DATED : May 25, 1993
INVENTOR(S) : Eddy Norman, Jr., et al It is certified that error appears in the above-indentified patent and that said Letters Patent is hereby corrected as shown below:

```
        Column 3, line 11, delete "o" and substitute the word
--or-- therefor;

Column  5,  line  23,  delete  "me&:"  and  substitute
--met-- therefor;

Column 8, line 9, delete the words "on ⓢside" and
substitute the words --one side-- therefor;

Column  10,  line  29,  delete  "on"  and  substitute
--one-- therefor; and

Column  16,  line  55,  delete  "en"  and  substitute
--end-- therefor.
```

Signed and Sealed this

Eighteenth Day of January, 1994

Attest:

BRUCE LEHMAN

*Attesting Officer*       *Commissioner of Patents and Trademarks*